Nov. 6, 1951 LE ROY J. VINCENT 2,574,361
ELECTRICAL ACCELEROMETER CIRCUIT
Filed Sept. 21, 1949
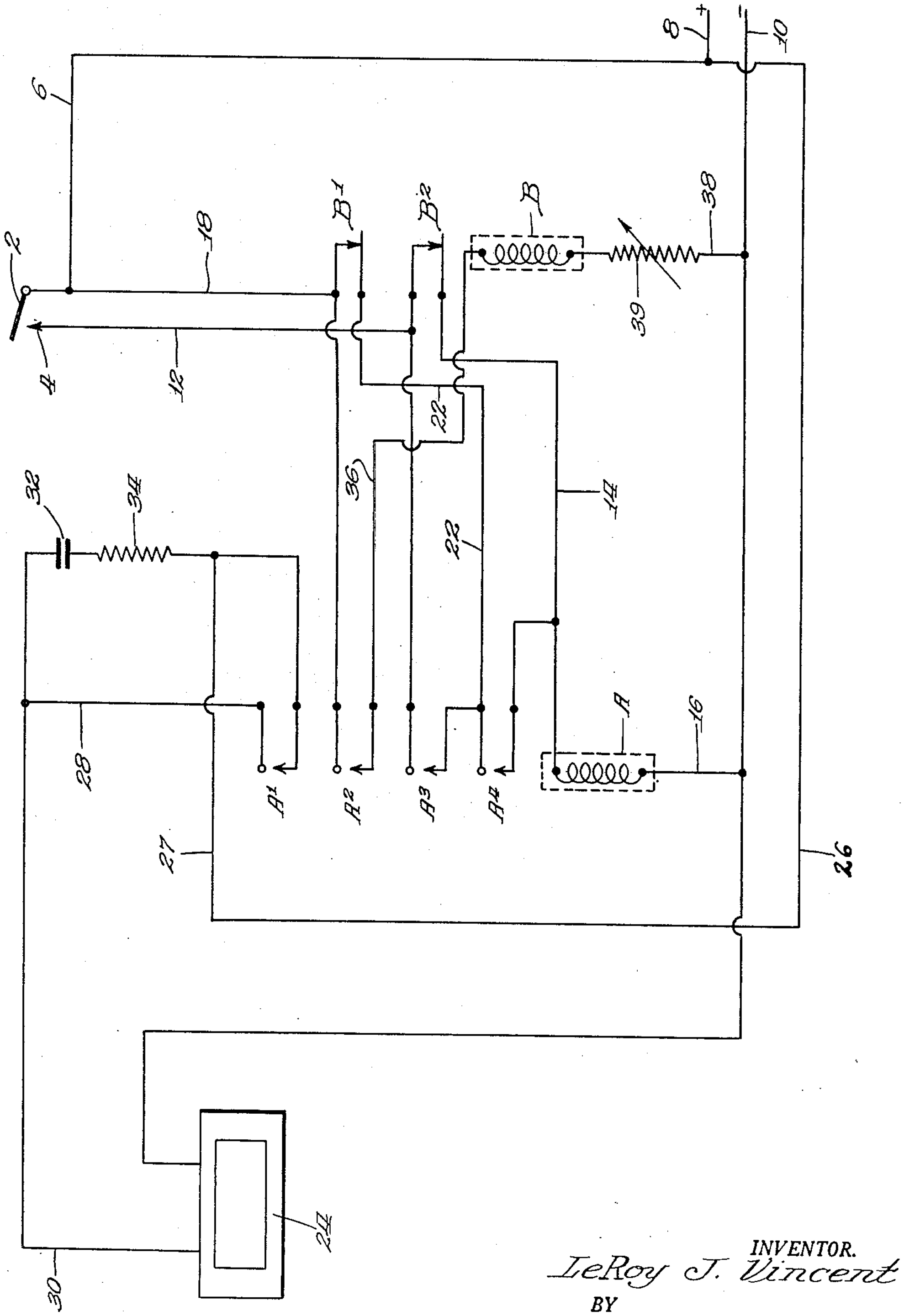
INVENTOR.
LeRoy J. Vincent
BY
Irvin O.B. Farner
Atty.

Patented Nov. 6, 1951

2,574,361

UNITED STATES PATENT OFFICE 2,574,361

ELECTRICAL ACCELEROMETER CIRCUIT

Le Roy J. Vincent, St. Louis, Mo., assignor to American Steel Foundries, Chicago, Ill., a corporation of New Jersey Original application July 22, 1949, Serial No. 106,238. Divided and this application September 21, 1949, Serial No. 116,899

7 Claims. (Cl. 235—92)

This invention relates to accelerometers and more particularly to a novel electrical counting system for accurately indicating impacts detected by the accelerometer. The instant application is divided out of a copending application, Serial No. 106,238, filed July 22, 1949, in the names of Russell C. Taylor and Le Roy J. Vincent.

A general object of the invention is to devise an electrical system such as above described capable of accurately recording and counting impacts.

A further object of the invention is to provide in a system, such as above described, novel means for insuring that a single impact is counted only once despite the time duration thereof.

Another object of the invention is to devise an electrical counting system which will count impacts occurring at a frequency less than a predetermined rate and will fail to count impacts occurring at a frequency greater than said rate.

The foregoing and other objects and advantages of the invention will become apparent from a consideration of the following specification and the accompanying drawing wherein the single figure is a wiring diagram of an electrical counting system comprehending a preferred embodiment of the invention.

Referring now to the drawing which is a wiring diagram of the novel electrical counting system utilized in the invention, the movable and fixed contacts 2 and 4 are diagrammatically indicated, the movable contact 2 being connected to a lead 6 which is connected to a main line 8, adapted for connection to one terminal of an associated voltage supply (not shown). The opposite terminal of said supply is connected to another main line 10.

Upon closing of the contacts 2 and 4, due to an impact actuating the contact 2, an initial circuit is closed through a relay A. This circuit may be traced through a lead 12 connected to the contact 4 and thence through a normally closed relay switch $B^2$ through a lead 14 connected to one terminal of the relay A, and thence through a branch lead 16 of the main line 10, connected to the other terminal of the relay A. In response to the energization of relay A which results from the closure of this initial circuit, relay switches $A^1$, $A^2$, $A^3$, and $A^4$ are also closed.

Closing of relay switch $A^4$ establishes a holding circuit through the relay A which may be traced through a branch lead 18 of the lead 6, through a normally closed relay switch $B^1$ and thence through a lead 22 and the relay switch $A^4$ through the relay A, and the branch lead 16 of the main lead 10.

Closing of relay switch $A^1$ establishes an actuating circuit through a conventional electrical counter 24 which circuit may be traced through a lead 26 of main line 8, through the switch $A^1$ and a lead 27 connected to one terminal thereof and thence through a branch lead 28 of a lead 30 connected to a terminal of the counter 24, the other terminal of the counter being connected to the main line 10. It may be noted at this point that when the circuit through the counter is broken, as hereinafter described, an electromotive force is generated by the collapse of the field about the counter coil (not shown) and this electromotive force flows through the lead 30 to a condenser 32 therein and thence through a resistance 34 to the lead 26 of the main line 8.

Closing of relay switch $A^2$ establishes a circuit through a relay B containing a conventional time delay (not shown), which circuit may be traced through the branch lead 18 and the switch $A^2$, and thence through a lead 36 connected to one terminal of the relay B, and through a lead 38 connected to the other terminal of the relay B, and to the main line 10, said lead 38 containing a variable resistance 39 for adjusting the delay action of the relay B. It may be noted that the relay B upon energization thereof is adapted, after a predetermined time interval, to open relay switches $B^1$ and $B^2$, thereby breaking the initial circuit and the holding circuit through the relay A to restore the system to the original condition preparatory to counting another impact. The time delay contained in relay B causes both the opening and closure of this relay to be delayed thereby permitting the counter mechanism sufficient time to register a count and also to regain its starting position before the several relay switches are in position to respond to another impact.

It may be noted that at the time switches $B^1$ and $B^2$ are opened in response to energization of the relay B, the switches $A^3$ and $A^4$ are closed and thus if the contacts 2 and 4 are still closed when the switches $B^1$ and $B^2$ open, the relay A remains energized due to a secondary holding circuit which may be traced from the lead 6 of the main line 8, through the contacts 2 and 4, and thence through the lead 12 and the switches $A^3$ and $A^4$ and the lead 14 connected to one terminal of the relay A and thence through the lead 16 connected to the other terminal of the relay A and to the other main line 10. Thus, if the contacts 2 and 4 are still closed because of the duration of the initial impact or are closed because of another impact at the time that the relay switches $B^1$ and $B^2$ are open in response to energization of the relay B, the relay A remains energized thereby maintaining all of its switches $A^1$, $A^2$, $A^3$ and $A^4$ closed. In this manner, the system is positively prevented from counting a single impact more than once or from counting impacts occurring at a rate greater than a predetermined rate governed by the time delay of the relay B.

In this connection it may be noted that it has been discovered in the testing of railway car trucks that impacts occurring at a rate greater than the order of 400–700 per minute, are not sufficiently significant from a viewpoint of lading and truck damage to be counted, and it will be understood from the above description that upon initial closing of the contacts 2 and 4 the time interval for one complete cycle of counting is dependent on the time delay of the relay B, and that this interval is adjustable within the range 400–700 per minute by means of the variable resistor 39. Furthermore, after a counting circuit has been closed through the counter 24, another impact sufficient to close the contacts 2 and 4 and occurring at a time interval less than the delay period of the relay B is not counted as above described. Thus, it will be understood that I have devised a novel accelerometer circuit which is dependable in operation and is capable of counting impacts of a predetermined magnitude occurring at time intervals greater than a predetermined rate which may be adjusted for varying conditions to be tested.

It may be noted that, if desired, the relay A may be provided with a conventional time delay (not shown) to delay closing of this relay for an adjustable predetermined period of time subsequent to closing of the contacts 2 and 4 whereby upon closing of these contacts by an impact, the impact must be of sufficient time duration to maintain the contacts closed for a predetermined time interval governed by the delay action of the relay A, or otherwise the latter does not close its responsive switches and the impact is not counted.

I claim:

1. An electrical circuit for an accelerometer having spaced contacts adapted to be closed by an impact, said circuit including a pair of main lines adapted for connection to opposite terminals of a voltage supply, one of the lines being connected to one of said contacts, a first and a second normally closed relay switches, a first, a second, a third and a fourth normally open relay switches, said one line being connected through the first normally closed switch to the fourth normally open switch, said fourth normally open switch being connected to one terminal of a relay adapted when energized to close said normally open switches, the other terminal of said relay being connected to the other main line, said one terminal being connected to the other contact through the second normally closed switch, said other contact being connected directly to the third normally open switch, which is connected to said one terminal of said relay, another relay adapted when energized to open the normally closed switches and having one terminal connected through the second normally open switch to said one line, the other terminal of said other relay being connected to the other line, and an electrical counter adapted for actuation upon closing of the first normally open switch.

2. An electrical circuit for an accelerometer having spaced contacts adapted to be closed by an impact, said circuit comprising a pair of main lines adapted for connection to opposite terminals of an associated voltage supply, a first, a second, a third and a fourth normally open switches, a relay adapted to close said switches, the third switch being connected to one contact and being connected in series with the fourth switch to one terminal of the relay, the opposite terminal of which is connected to one line, the other line being connected to the other contact, a pair of normally closed switches, one connected between said other line and the fourth switch, and the other connected between said one contact and said one terminal, a second relay adapted to open the normally closed switches and having a terminal connected through the second switch to said other line and having another terminal connected to said one line, and a counter operatively connected to the first normally open switch for actuation each time the same closed.

3. In an electrical system for an acceleratometer having a pair of relatively movable contacts adapted to close when subjected to an impact; a pair of relays, means for establishing a circuit through one of the relays to energize the same upon closing of said contacts, means responsive to energization of said one relay for establishing a holding circuit therethrough, means responsive to energization of said one relay for counting the closing of said contacts, means responsive to energization of said one relay for energizing the other relay, means responsive to energization of said other relay for breaking said circuits, and means responsive to energization of said one relay for establishing a secondary holding circuit through said one relay and through said contacts, whereby upon energization of said other relay and consequent breaking of the first and second mentioned circuits, and said one relay is de-energized only if said contacts are open.

4. In an electrical system for an accelerometer having spaced relatively movable contacts adapted to close when subjected to an impact; the combination of a relay having one terminal connected to a terminal of an associated voltage supply, the other terminal of said relay being connected to one of the contacts and the other contact being connected to the other terminal of said voltage supply, means responsive to energization of said relay for registering a count, means solely responsive to energization of said relay for establishing a holding circuit therethrough, a second relay, means solely responsive to energization of the first-mentioned relay for energizing the second relay, and switch means in the connection between said other terminal and said one contact, said last mentioned means being responsive solely to energization of the second relay for breaking the connection between the first-mentioned relay and the related contact.

5. In an electrical system for an accelerometer having spaced contacts adapted to being closed by an impact; the combination of a relay, said contacts when closed establishing an electrical circuit through the relay, means responsive to energization of the relay for registering a count, means solely responsive to energization of the relay for establishing a holding circuit therethrough independently of said contacts, means solely responsive to energization of said relay for establishing a secondary holding circuit therethrough and through said contacts, another relay, means solely responsive to energization of the first mentioned relay for establishing an electrical circuit through the other relay, and means solely responsive to energization of said other relay for breaking the first-mentioned circuit and for breaking the first-mentioned holding circuit.

6. In an electrical system for counting impacts; the combination of a relay, a pair of contacts adapted to close when subjected to an impact and adapted when closed to establish an electrical circuit through said relay, switch means responsive to energization of said relay for establishing an electrical holding circuit through said relay and through said contacts, means responsive to energization of said relay for counting an impact, a second relay, switch means solely responsive to energization of said one relay for establishing an electrical circuit through the second relay to energize the same, and switch means solely responsive to energization of said second relay for breaking the first- and second-mentioned circuits.

7. In an electrical system for counting impacts; the combination of relay means, contacts adapted when subjected to an impact to close a circuit through the relay means, means responsive to closing of said circuit for indicating an impact, means solely responsive to energization of said relay means for establishing a primary holding circuit therethrough independently of said contacts, means solely responsive to energization of said relay means for establishing a secondary holding circuit therethrough and through the contacts, other relay means, means solely responsive to energization of the first mentioned relay means for energizing said other relay means, and means solely responsive to energizing of said other relay means for breaking the first mentioned circuit and the primary holding circuit.

LE ROY J. VINCENT.

REFERENCES CITED

The following references are of record in the file of this patent:

UNITED STATES PATENTS

| Number | Name | Date |
|---|---|---|
| 2,313,627 | Cooper | Mar. 9, 1943 |